United States Patent [19]
Sygen et al.

[11] Patent Number: 5,235,797
[45] Date of Patent: Aug. 17, 1993

[54] METHOD OF HARVESTING AQUATIC PLANTS

[75] Inventors: Victor V. Sygen, Eagan; David J. Burton, Woodbury; Lawrence J. DeVore, Minneapolis, all of Minn.

[73] Assignee: The Lemna Corporation, Mendota Heights, Minn.

[21] Appl. No.: 835,235

[22] Filed: Feb. 13, 1992

[51] Int. Cl.⁵ .......................................... A01D 44/00
[52] U.S. Cl. .............................................. 56/9; 56/8
[58] Field of Search ................... 56/8, 9; 210/242.1, 210/242.2, 242.3, 443.1, 456

[56] References Cited

U.S. PATENT DOCUMENTS

| | | |
|---|---|---|
| 2,065,733 | 12/1936 | Pearson . |
| 2,283,472 | 5/1942 | Tuxhorn . |
| 2,330,508 | 9/1943 | McColl ........................ 210/242.3 |
| 3,155,609 | 11/1964 | Pampel . |
| 3,248,812 | 5/1966 | Gardner, Jr. ........................ 56/9 X |
| 3,385,786 | 5/1968 | Klock . |
| 3,456,385 | 7/1969 | Plath . |
| 3,546,858 | 12/1970 | Chaplin ........................ 56/9 |
| 3,613,891 | 10/1971 | Cloutier . |
| 3,653,192 | 4/1972 | Bryant . |
| 3,708,070 | 1/1973 | Bell . |
| 3,839,198 | 10/1974 | Shelef . |
| 3,911,514 | 10/1975 | Ito . |
| 3,927,491 | 12/1975 | Farnsworth . |
| 3,959,923 | 6/1976 | Selke . |
| 3,966,613 | 6/1976 | Kirk et al. . |
| 4,133,141 | 1/1979 | Lee . |
| 4,151,081 | 4/1979 | Bolli et al. . |
| 4,169,050 | 9/1979 | Serfling et al. . |
| 4,209,943 | 7/1980 | Moeller et al. . |
| 4,240,243 | 12/1980 | Deal ........................ 56/9 X |
| 4,248,033 | 2/1981 | Bryant . |
| 4,261,160 | 4/1981 | Niewiera ........................ 56/9 X |
| 4,265,757 | 5/1981 | Ivanoff . |
| 4,320,594 | 3/1982 | Raymond . |
| 4,324,067 | 4/1982 | Kessler . |
| 4,333,837 | 6/1982 | Plosz et al. . |
| 4,382,348 | 5/1983 | Kitsu et al. . |
| 4,487,588 | 12/1984 | Lewis et al. . |
| 4,536,988 | 8/1985 | Hogen . |
| 4,734,193 | 3/1988 | Cvitas et al. . |
| 4,795,567 | 1/1989 | Simpson et al. . |
| 5,031,390 | 7/1991 | Bryant . |

FOREIGN PATENT DOCUMENTS

| | | |
|---|---|---|
| 241896 | 12/1964 | Austria . |
| 2239120 | 7/1973 | France . |
| 2361060 | 1/1977 | France . |
| 906455 | 2/1981 | U.S.S.R. . |
| 1373035 | 11/1974 | United Kingdom . |

OTHER PUBLICATIONS

*Operations Forum*, vol. 4, Aug., 1987.
*Journal WPCF*, vol. 60, No. 7, Jul., 1988, 1253–1258.
*Mud Cat In Action*, National Car Rental System, Inc., Public Works, Dec., 1981.
*Aerated Lagoon Systems with Improved Performance*, Linvil G. Rich, Water/Engineering & Management, Feb., 1982.
*A Low-Cost Secondary Treatment Alternative*, Linvil G. Rich, Water/Engineering & Management, Feb., 1982.

Primary Examiner—George A. Suchfield
Attorney, Agent, or Firm—Kinney & Lange

[57] ABSTRACT

Aquatic plants are harvested from a body of water. The aquatic plants are gathered from the surface of the body of water and transported to a collection zone at a collection point on the body of water. The aquatic plants are then moved from the collection zone to an aquatic plant processing station.

27 Claims, 7 Drawing Sheets

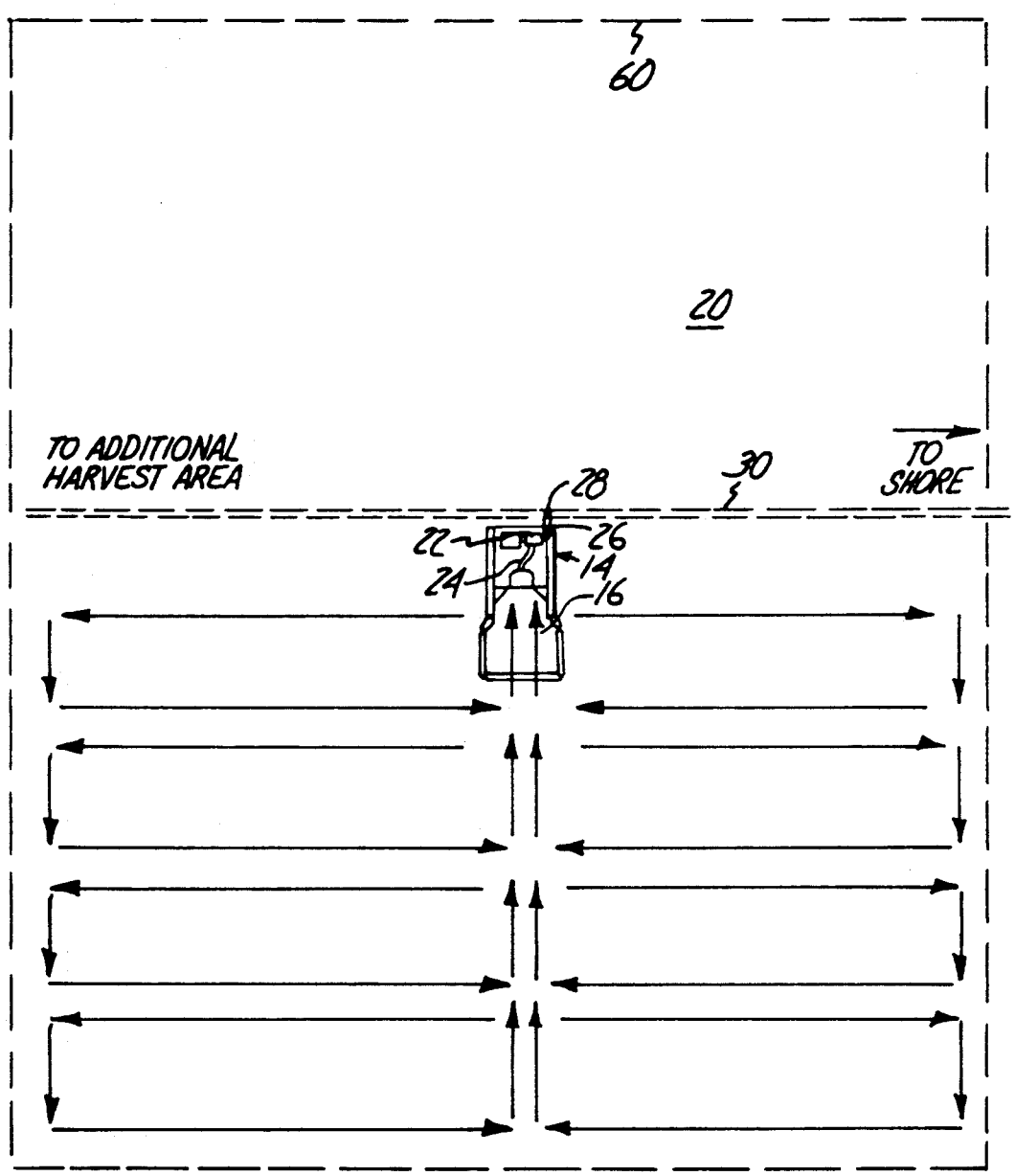

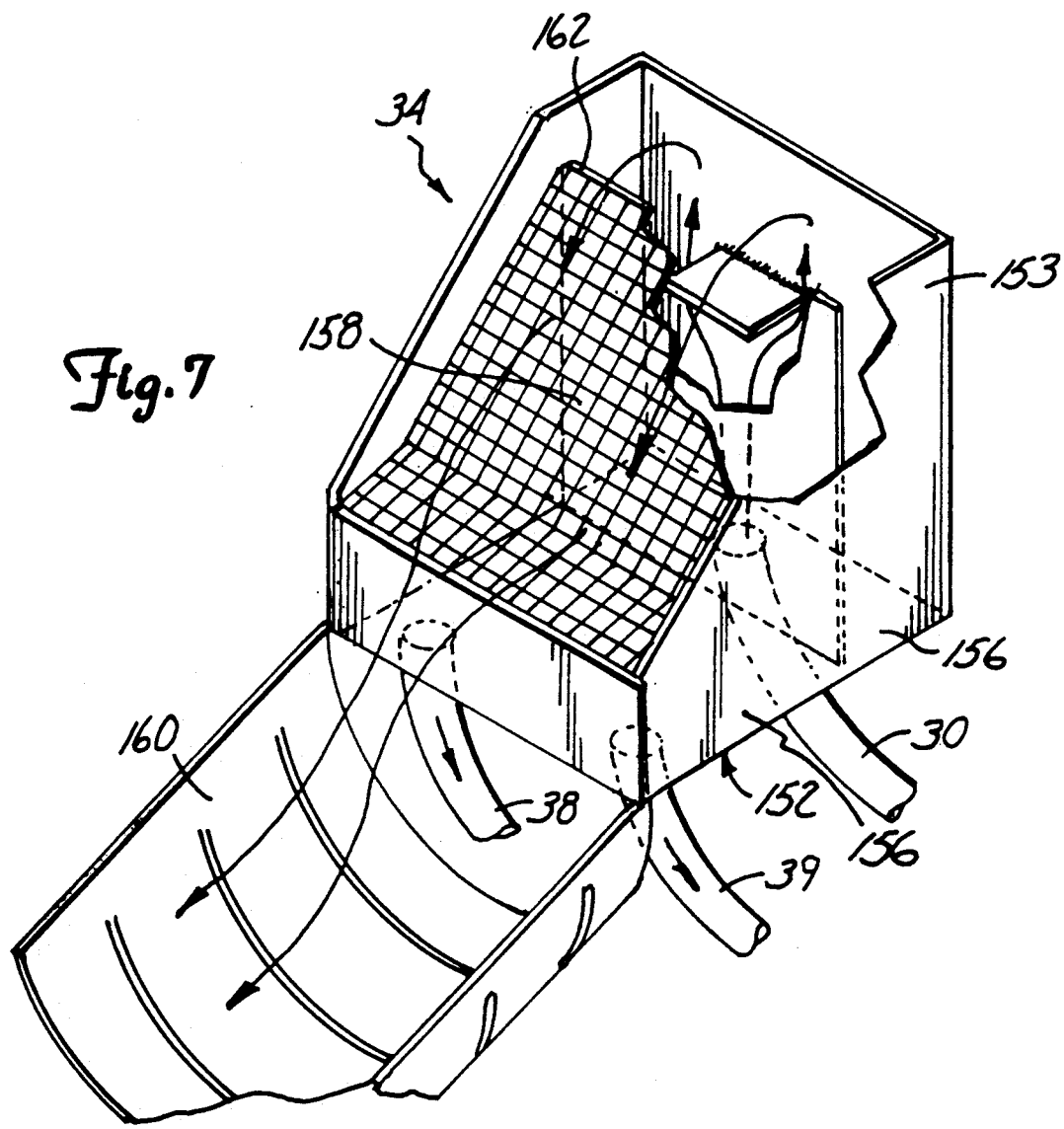

METHOD OF HARVESTING AQUATIC PLANTS

INCORPORATION BY REFERENCE AND REFERENCE TO CO-PENDING APPLICATIONS

The following patent and patent applications are hereby fully incorporated by reference: Hogen U.S. Pat. No. 4,536,998 entitled AQUATIC BIOMASS CONTAINMENT BARRIER AND METHOD OF ASSEMBLING SAME and issued on Aug. 27, 1985; a patent application entitled AQUATIC PLANT HARVESTING SYSTEM, Ser. No. 07/759,488, filed on Sep. 13, 1991 by Brian J. Midtling et al; all of which are assigned to the same assignee as the present invention.

BACKGROUND OF THE INVENTION

The present invention relates to aquatic plants. More particularly, the present invention relates to harvesting aquatic plants from a body of water.

There has been an increasing interest in the use of aquatic plants as a food source or cash crop. Additionally, aquatic plants have found use in waste water treatment. Growing and harvesting aquatic plants has thus become an increasingly important industry.

Improving the efficiency of growth and harvest techniques is an important factor in continued expansion in the industry of aquatic plant production. U.S. Pat. No. 4,536,998 describes a system of growing aquatic plants which increases yield and the effectiveness of those plants for waste water treatment. Continued improvement of harvesting techniques is important to continued industry growth.

An aquatic plant, such as duckweed, grows near the surface of a body of water, and tends to have a rather large volume relative to its weight, i.e., a relatively low density. However, aquatic plants can take on a variety of forms depending on many factors, including its life cycle stage, density and root length. In order to harvest the plant, a harvesting device must be suited to lift the aquatic plant in densities ranging from a thin "mono-layer" approximately 1/10 of an inch thick, to a 1"-4" thick semi-solid mat of aquatic plants with the consistency of mud. In the "mono-layer" state, the aquatic plant disburses to fill gaps on the water surface. In the "semi-solid" state, the aquatic plant adheres to itself resisting separation.

In the past, aquatic plants were harvested from a body of water by a floating harvester. The aquatic plants were collected by the harvester and hauled to the shore where they were off-loaded. Such a system is inherently inefficient due to the travel time required by the harvester in moving from the area of the pond which it is harvesting to the shore with a full load, and then returning to the harvesting area. As the size of waste water ponds or lagoons increases, the cost of harvesting drastically increases due to the travel time of the harvester to and from the unloading zone on shore. Further, the cost of additional harvesters is prohibitively expensive and requires additional manpower.

SUMMARY OF THE INVENTION

The present invention greatly reduces the non-productive travel time of an aquatic plant harvester. Consequently, the present invention increases the efficiency of aquatic plant harvesting. The aquatic plants are gathered from a body of water and transported to a collection zone. The collection zone is located on the body of water from which the plants are harvested. The aquatic plants are then pumped from the collection zone to a processing station on shore.

In one preferred embodiment, the collection zone is defined by a collection point which is floating on the body of water from which the aquatic plants are harvested. A load of aquatic plants is gathered by a harvester and unloaded in the collection zone. A conduit is provided from the collection zone to the dewatering station. The aquatic plants are pumped through the conduit from the collection zone to an on-shore dewatering station. Therefore, the harvester simply collects the plants and brings them to a central location on the body of water where the aquatic plants are unloaded. The harvester can then begin harvesting a new load of aquatic plants while the previous load is being pumped to the dewatering station on shore. This substantially eliminates any downtime or non-productive time of the harvester since it is no longer necessary for the harvester to make a run to shore each time it has a full load of aquatic plants.

BRIEF DESCRIPTION OF THE DRAWINGS

FIG. 3 illustrates a preferred harvesting pattern to be followed by an aquatic plant harvester.

FIG. 7 shows a portion of a dewatering station for dewatering aquatic plants.

DETAILED DESCRIPTION OF THE PREFERRED EMBODIMENTS

Figure 1:
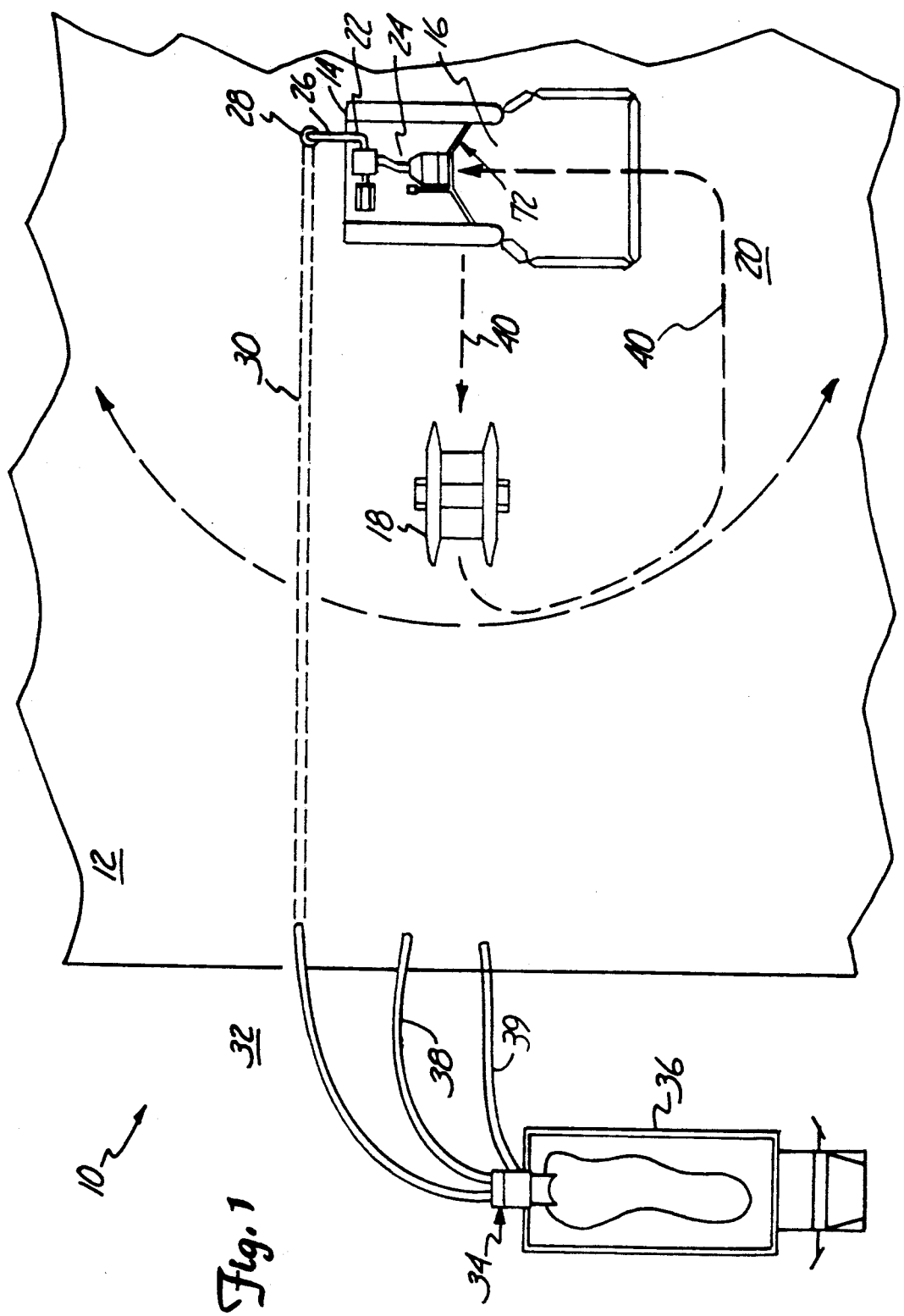
FIG. 1 shows an aquatic plant harvesting system of the present invention.

FIG. 1 shows an aquatic plant harvesting system 10 of the present invention including waste water treatment pond 12, collection point 14, an operator driven aquatic plant harvester 18, conduit or pipe 30, dewatering station 34, truck 36 and return hoses 38 and 39. Waste water treatment pond 12 can be any type of known waste water treatment pond which is suited for growing, on its surface, an aquatic plant such as duckweed. Collection point 14 is provided on the surface of waste water treatment pond 12, in this preferred embodiment, as a floating collection point. Collection point 14 has a collection zone generally defined at 16 for holding aquatic plants. Aquatic plant harvester 18 (harvester 18) is provided for collecting aquatic plants from a harvesting area on pond 12 generally designated as area 20.

In general, harvester 18 moves about the surface of harvesting area 20 collecting aquatic plants from the surface. Harvester 18 then moves to collection point 14 depositing the gathered aquatic plants in collection zone 16 of collection point 14.

A pump 22 is provided at collection point 14. An intake structure 72, with intake hose 24, is connected between the collection zone 16 and pump 22. Pump 22 is also coupled by connecting hose 26 to a floating pipe connector 28. Floating pipe connector 28, in turn, is connected to pipe 30 which extends to shore 32 and up to dewatering station 34. In the embodiment shown in FIG. dewatering station 34 is placed adjacent a truck bed of a truck 36. Return hoses 38 and 39 are coupled from dewatering station 34 back to pond 12.

Harvester 18 typically moves radially away from collection point 14, within harvesting area 20, collecting aquatic plants from the surface of pond 12. When harvester 18 is approximately half full, harvester 18 turns and moves generally toward collection point 14. The path of harvester 18 is indicated by dashed line 40.

On its return trip, harvester 18 substantially fills with aquatic plants harvested from harvesting area 20. Then harvester 18 enters collection zone 16 in collection point 14 and unloads the collected aquatic plants. After unloading the plants, harvester 18 returns to harvest area 20 and makes another generally radial harvesting sweep within harvest area 20.

While harvester 18 begins its next harvesting sweep, pump 22 creates a suction, through intake hose 24, at intake structure 72. An aquatic plant slurry, including aquatic plants and water from pond 12, enters intake structure 72, flows through hose 24 and is pumped through connection hose 26 to floating connector 28 and into pipe 30. The slurry is pumped through pipe 30 onto shore 32 and into a dewatering station 34. Dewatering station 34 substantially separates the aquatic plants from the water in the aquatic plant slurry. In this embodiment, the aquatic plant falls into a truck bed of truck 36 and the water from the aquatic plant slurry is returned to pond 12 through return hoses 38 and 39.

Harvesting system 10 is thus far more efficient than previous harvesting systems. Harvester 18 need not make long trips from harvest area 20 on pond 12 back to shore 32 with a full load. Rather, harvester 18 moves away from collection point 14 to acquire half of its load, and returns to collection point 14 to acquire the second half of its load. Harvester 18 then unloads the aquatic plants at collection point 14 and immediately begins another harvesting sweep. Meanwhile, pump 22 transfers the aquatic plants unloaded at collection point 14 to a processing station on shore 32. Therefore, the present invention substantially eliminates downtime of harvester 18 previously caused by making runs from the harvesting area to shore and back to the harvesting area.

Figure 2:
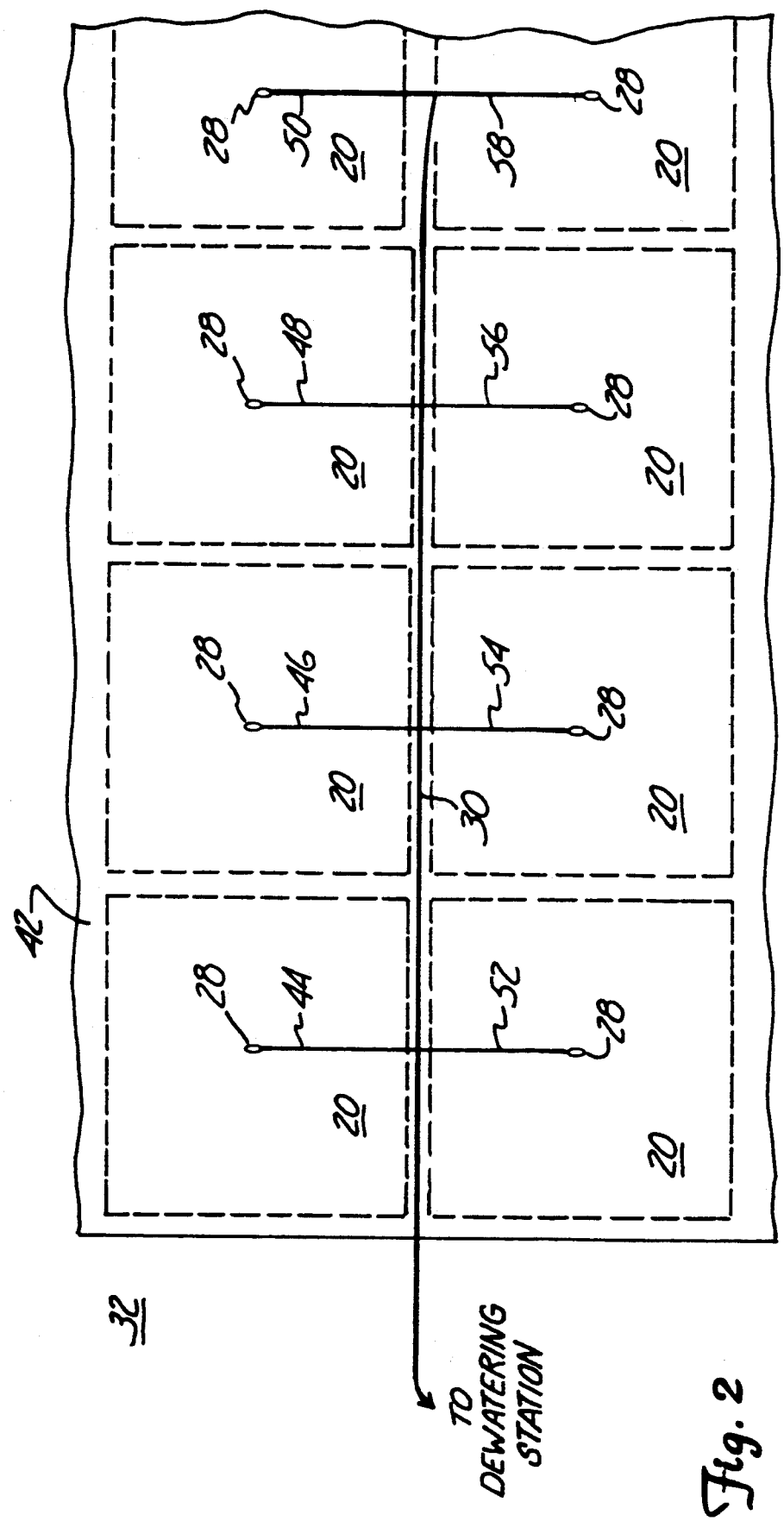
FIG. 2 shows a waste water pond having a plurality of harvesting areas.

FIG. 2 shows a portion of another embodiment of the present invention. Some of the elements of FIG. 2 are similar to those shown in FIG. and are correspondingly numbered. A harvesting pond 42 is substantially larger than pond 12 shown in FIG. 1. In order to accommodate the extra size of pond 42, pipe 30 is provided with a plurality of branches 44, 46, 48, 50, 52, 54, 56 and 58. At the end of each of the branches are floating connectors 28.

Surrounding each of the plurality of floating connectors 28 is a harvesting zone 20. Each harvesting area 20 is similar in that a typical harvester moving away from the connector 28 in the associated harvesting area 20 would be approximately half full, depending on the thickness of the aquatic plant mat, at the point where it reached the boundary of harvesting area 20. Thus, in one trip from connector 28 to the boundary of harvest area 20 and back to connector 28, a typical harvester 18 would have a full load of aquatic plants.

In harvesting pond 42, an operator driving a harvester 18 tows collection point 14, shown in FIG. 1, into one of the harvest areas 20 and couples connection hose 26 to the floating connector 28 within the harvest area 20. Then the operator starts the pump 22 attached to collection point 14 and begins making harvesting sweeps on harvester 18 within the harvest area 20, depositing the loads of aquatic plants which it collects in the collection zone 16 of the collection point 14. Once the operator has harvested substantially all of the aquatic plants in the designated harvest area 20, and once those plants have been pumped from collection zone 16 in collection point 14 to dewatering station 34, the operator disconnects connection hose 26 from the floating connector 28 and tows collection point 14 to another harvesting area 20 where the operator again begins harvesting aquatic plants.

In this way, aquatic plants can be harvested from the entire pond 42 with substantially no downtime of harvester 18. Even where the harvesting area furthest from shore 32 is being harvested, harvester 18 has substantially no downtime. This drastically increases the efficiency of harvesting aquatic plants from a waste water treatment lagoon or pond such as pond 42.

FIG. 3 shows an enlarged view of a harvesting area 20 designated by a dashed line 60. As shown in FIG. 1, a collection point 14 is coupled by connection hose 26 to a floating connector 28. Floating connector 28 is, in turn, connected to pipe 30. One preferred harvesting sweep pattern is illustrated in FIG. 3 by arrow 62. For the sake of clarity, the sweep pattern is only illustrated in half of harvesting area 20.

The generally rectangular sweep pattern 62 is similar to the radial oval pattern 40 shown in FIG. 1. In other words, harvester 18 starts moving generally away from the collection point 14 until it is approximately half full of aquatic plants. (This would typically be when harvester 18 reaches the boundary of harvest area 20). Then harvester 18 makes a turn and moves generally toward collection point 14 acquiring the rest of its load of aquatic plants. Finally, harvester 18 pulls into containment zone 16 in collection point 14 and unloads the aquatic plants which it has collected.

With pattern 62, there is a small amount of downtime for harvester 18. For example, when it is making the rectangular sweep furthest from collection point 14 in harvest area 20 it must travel a short distance to and from collection point 14. However, the downtime is greatly reduced as compared to downtime experienced with previous harvesting systems in which the harvester had to make many non-productive trips from the harvesting area to shore and back to the harvesting area.

In addition, the harvesting pattern 62 shown in FIG. 3 may be particularly advantageous where the harvesting areas are physically separated on the surface of the pond. For example, in some water treatment facilities, such as that described in U.S. Pat. No. 4,536,998, a surface grid system is put in place on the surface of the water. Where the grid defines a number of square areas on the surface of the water, it is advantageous to use the generally rectangular harvesting sweep pattern 62 shown in FIG. 3 to more completely and efficiently harvest the harvest area 20.

Figure 4A:
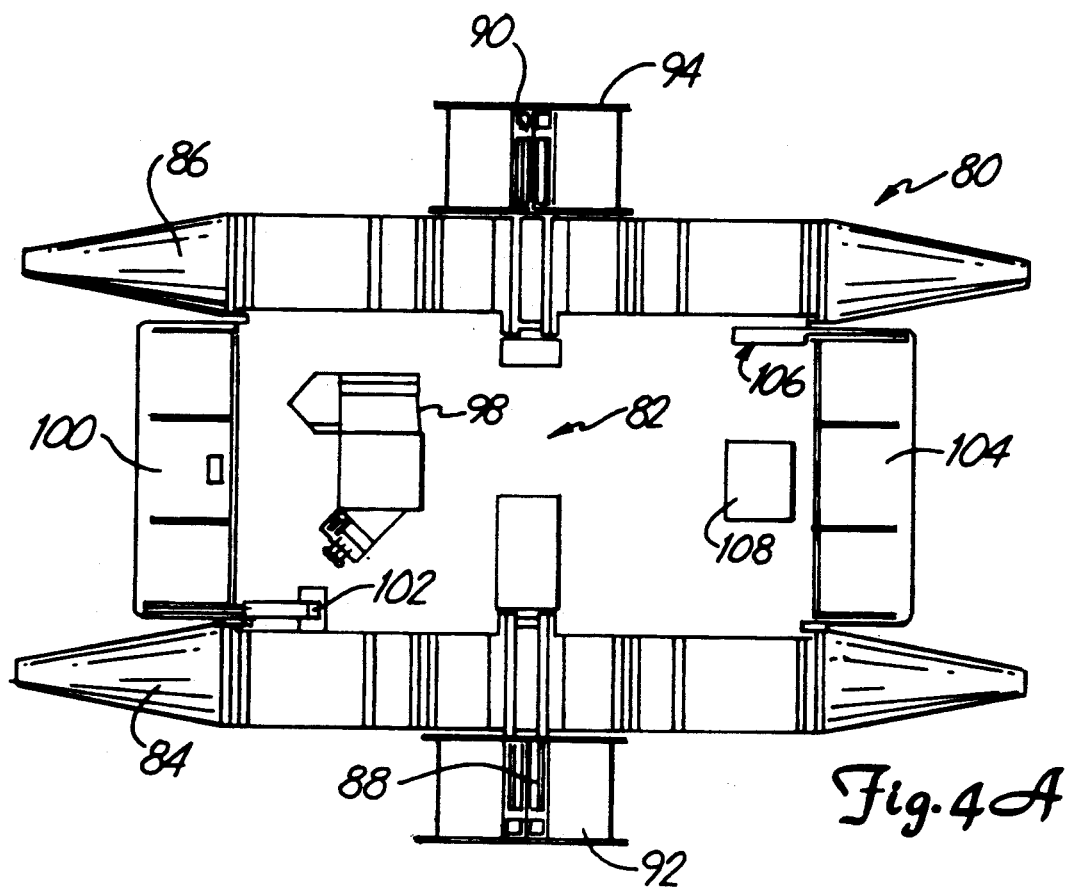
FIGS. 4A-4B show one embodiment of an aquatic plant harvester.

FIG. 4A is a top plan view of an aquatic plant harvester 80 which could be used as harvester 18 in FIGS. 1-3. Aquatic plant harvester 80 includes deck 82 which carries port pontoon 84 and starboard pontoon 86. Port paddle wheel motor 88 and starboard paddle wheel motor 90 are located inside port paddle wheel 92 and starboard paddle wheel 94, respectively. The operator console 98 is located at the front of the harvester.

Retractable bow gate 100 extends between port pontoon 84 and starboard pontoon 86 at a bow end of aquatic plant harvester 80. Bow gate retractor 102 is coupled to retractable bow gate 100. Retractable aft gate 104 extends between port pontoon 84 and starboard pontoon 86 at an aft end of aquatic harvester 80. Aft gate retractor 106 is coupled to retractable aft gate 104. Power source 108 is included in aquatic plant harvester 80 and provides power for operation of aquatic plant harvester 80.

Figure 4B:
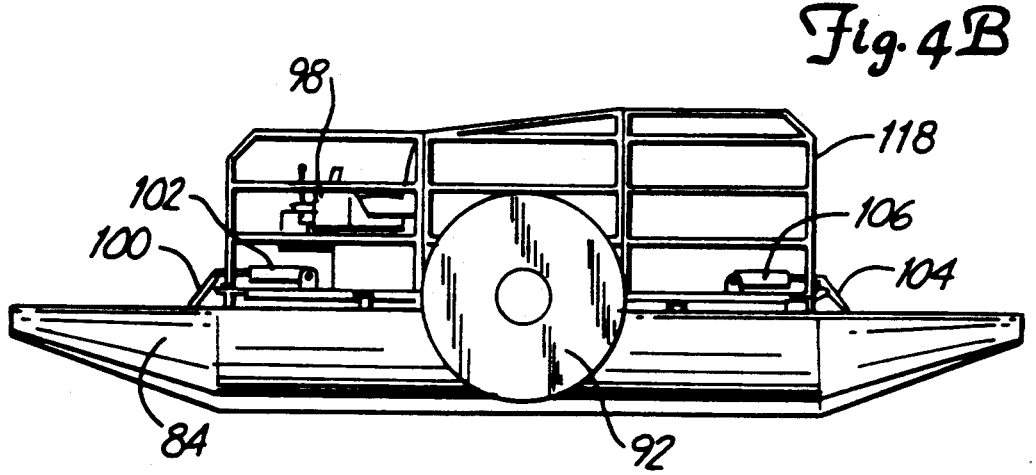

FIG. 4B is a side view of aquatic plant harvester 80 showing retractable bow gate 100 and retractable aft gate 104 both in their down or vertical positions. Guard rail 118 is also shown.

In operation, aquatic plant harvester 80 moves in a forward direction to harvest aquatic plants such as, for example, various species of the duckweed family. The aquatic plant harvester 80 compresses the harvested aquatic plants and thereby increases storage capacity of aquatic plant harvester 80. Aquatic plant harvester 80 is designed to travel over a floating aquatic plant barrier matrix (as described in U.S. Pat. No. 4,536,998), and collect aquatic plants trapped between barriers.

As aquatic plant harvester 80 moves in a forward direction, retractable bow gate 100 is lifted by bow gate retractor 102 so that it does not contact the water surface of pond 12 or the floating aquatic plants. Retractable aft gate 104 is placed in a substantially vertical position using aft gate retractor 106.

As aquatic plant harvester 80 moves forward, aquatic plants are collected in a containment area defined by port pontoon 84, starboard pontoon 86 and aft gate 104. Once the containment area of aquatic plant harvester 80 is full, aquatic plant harvester 80 pulls into containment zone 16 in collection point 14. Then, the gates are lifted upward, out of contact with the water surface and the aquatic plants, and the harvester 80 moves from above the aquatic plants, leaving them in collection zone 16.

Figure 5B:
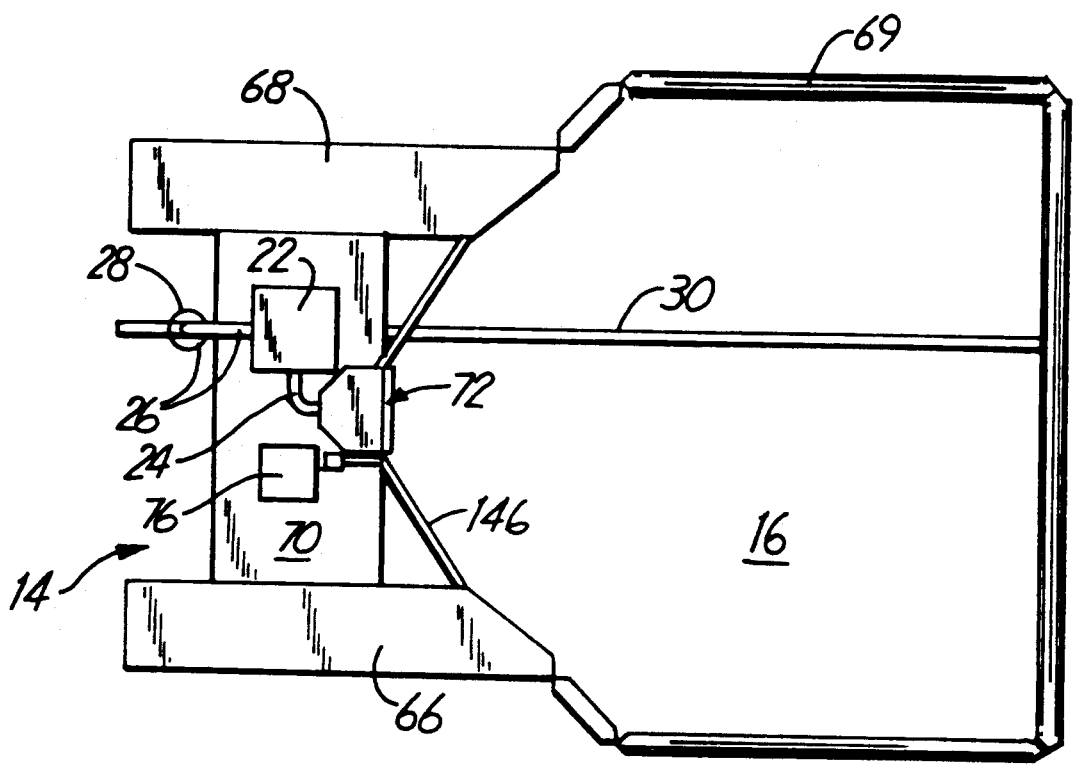
FIGS. 5A-5B show one embodiment of a collection point.
Figure 5A:
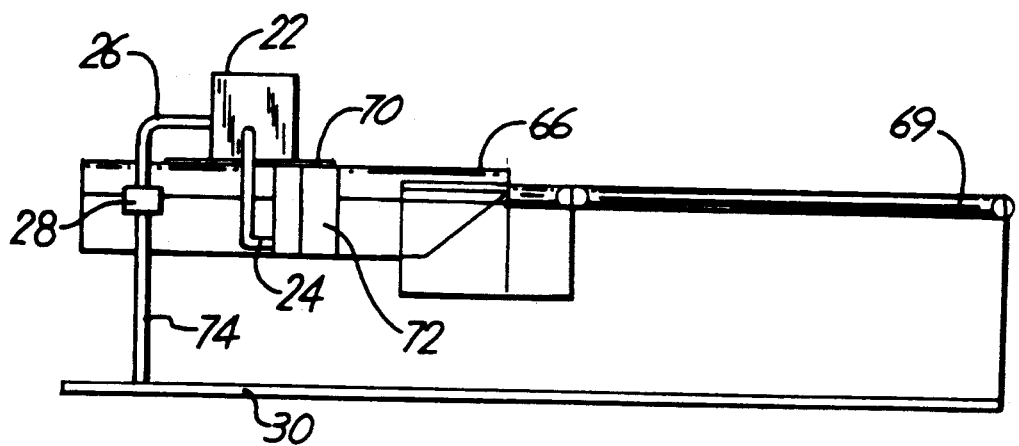

FIGS. 5A–5B show a side elevation, and a plan view of collection point 14, respectively. Collection point 14, in this embodiment, is a floating harbor which includes a pair of pontoons 66 and 68, a deck 70, a pump 22, and a containment area 16. Containment area 16 is defined by a floating baffle assembly 69 on three sides and by an intake structure 72 on the fourth side.

Pump 22 is fastened to deck 70 such that during movement of harbor 14 pump 22 remains secure on deck 70. When the harbor 14 is to be moved, the baffles 69 and the intake structure 72 are removed from the water and carried on board the harbor 14.

The intake structure 72 is connected to the pump 22 through pump intake hose 24. The intake structure 72 has an inlet consisting of a weir which has its crest positioned below the surface of the water to allow an aquatic plant slurry to enter the intake structure 72. The aquatic plant slurry is comprised of aquatic plants collected from the surface of the pond 12 and water drawn into intake structure 72 with the plants. This slurry is drawn from the intake structure 72 through intake hose 24 by the pump 22. The slurry is then pumped out of connection hose 26 through floating connector 28. Floating connector 28 is coupled, through a flexible hose 74, to pipe 30. Hose 74 is flexible so that it can be used in ponds with fluctuating water levels.

In one embodiment, harbor 14 is also equipped with fuel storage tank 76 and with an emergency shut-off switch for use by a remote operator. Restarting the pump 22 is only accomplished from the harbor 14 itself.

The floating baffle 69 is typically a baffle construction as described in the Hogen U.S. Pat. No. 4,536,998. Thus, baffle 69 allows the size of the containment area 16 to be adjusted simply by adding more sections to accommodate harvesters of different sizes. The containment area 16 is provided to prevent the aquatic plants from moving out of the range of influence of the intake structure 72 once the plants are deposited in the containment area by the harvester.

Figure 6A:
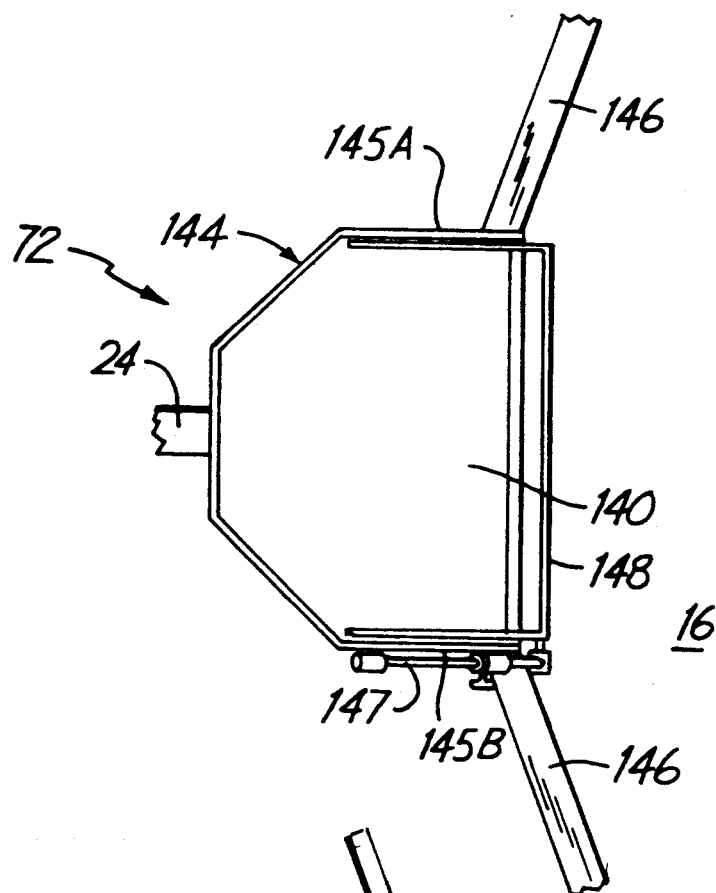
FIGS. 6A-6B show an intake for receiving aquatic plants in a collection zone.
Figure 6B:
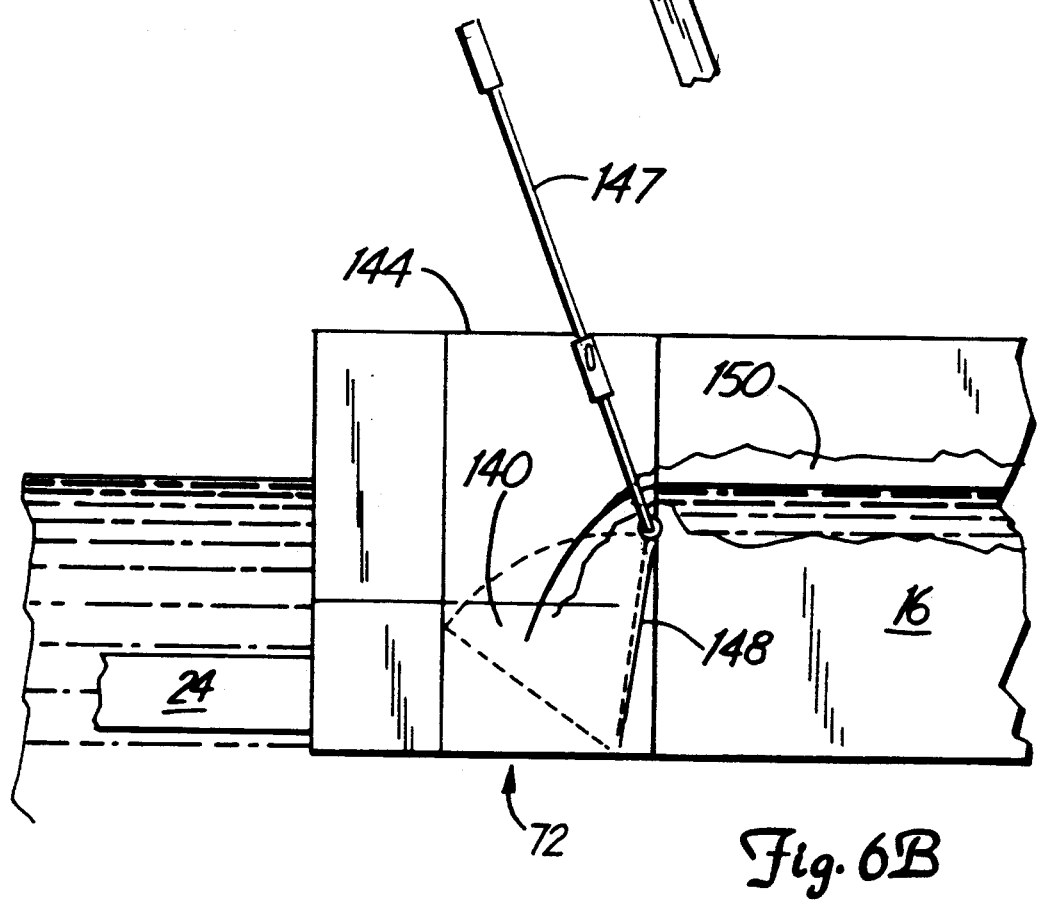

FIGS. 6A and 6B show a plan view and a side elevation of intake structure 72 as well as intake hose 24 in greater detail. Intake structure 72 includes an intake housing 144 which has walls and a floor that define a mixing chamber 140. Intake structure 72 also includes an adjustable weir crest 148 which allows water and the aquatic plant material 150 to enter the mixing chamber 140. The pump intake hose 24 is coupled to the back of the intake housing 144 of structure 72. The side walls 145a and 145b of intake housing 144 are attached to walls 146 of collection point 14 which are, in turn, attached to the insides of the floating collection point pontoons 66 and 68. This arrangement creates a funnel-shaped input for the intake structure 72.

The aquatic plants unloaded in the containment area 16 typically form a mat 150 at the surface of pond 12 within containment area 16. The inlet weir crest 148 is positioned using an adjustment handle 147. Adjustment handle 147 is manipulated to move the adjustable weir crest 148 to a desirable water level 50. The water falling over weir crest 148 forces the aquatic plant mat 150 into the mixing chamber 140.

The head differential across the weir provides a source of potential energy which helps to draw the aquatic plant mat 150 into the intake housing 144. As the aquatic plant mat 150 is drawn over the weir, it is accelerated until it reaches the interior water level of mixing chamber 140 inside intake housing 144. At that point the kinetic energy is dissipated as the plant material from mat 150 mixes with the intake water.

As it is mixed, the plant/water slurry is drawn into the intake hose 24 through the back of the mixing chamber 140. The intake hose 24 is, in this preferred embodiment, a non-collapsible hose of sufficient diameter to allow through-put of the aquatic plant slurry as required by the size of the pond 12 and the harvesting conditions. A typical diameter for intake hose 24 is 3 or 4 inches. The aquatic plant slurry is pumped, by pump 22, through flexible hose 74, and pipe 30, to dewatering station 34 on shore 32.

The weir crest depth must be set correctly for optimal performance. If the weir crest 148 is set too shallow, insufficient water will be allowed into the mixing chamber 140 and the pump 22 will starve. If the weir crest 148 is set too deep, the water will simply run under the mat 150 and a minimal amount of duckweed will be moved into mixing chamber 140. Adjustment may be necessary to accommodate mats 150 of varying thickness. Such a variation can be due to a number of factors such as the time since the mat 150 was last harvested or the length of the harvesting run.

In another embodiment, the adjustment of weir crest 148 can be made automatically. In that embodiment, a sensor is used to check the water level in the mixing chamber 140 and make adjustments to the weir crest depth to achieve a pre-determined optimum.

FIG. 7 is a more detailed diagram of dewatering station 34. Dewatering station 34 includes a housing 152 which houses an input reservoir (shown partially in phantom in FIG. 7) which is coupled to pipe 30. In this preferred embodiment, pipe 30 runs all the way to dewatering station 34 from flexible hose 74. Housing 152 also defines an output reservoir 156 which is coupled to return hoses 38 and 39. A screen 158 is coupled, within housing 152, to an upper portion of input reservoir 153 Screen 158 is tilted at an angle and extends substantially within housing 152 to a lower portion of housing 152 where it is attached to a directional chute 160.

It should also be noted that pipe 30 could terminate at the beginning of shore 32 with a quick disconnect mechanism. Then, a flexible hose could be coupled from pipe 30 to dewatering station 34.

In operation, the aquatic plant slurry is pumped through pipe 30 into input reservoir 153. Input reservoir 153 fills with the aquatic plant slurry until the aquatic plant slurry begins spilling over an edge 162 of the input reservoir 153 onto screen 158. It should be noted that the edges of housing 152 extend past edge 162 of input reservoir 153 so that spillage of the aquatic plant slurry is contained and directed over screen 158.

As the aquatic plant slurry spills over edge 162, it is drawn by gravitational force, and by the force of additional spillage of aquatic plant slurry over edge 162, down screen 158 towards directional chute 160. Screen 158 has openings and wire sizes sufficient to screen the aquatic plant from the aquatic plant slurry. Thus, as the slurry moves down tilted screen 158, the water falls through screen 158 and enters output reservoir 156. Meanwhile, the aquatic plant does not pass through screen 158 but continues to travel down screen 158 to directional chute 160. Directional chute 160 can be repositioned in various directions to direct the aquatic plant to its destination. The aquatic plant can be directed into a composting bin, a drying area, or the bed of a truck or any number of other suitable destinations.

The water which enters output reservoir 156 exits the output reservoir 156 through return hoses 38 and 39. In this preferred embodiment, return hoses 38 and 39 are non-collapsible hoses of sufficient length to reach from the dewatering station 34 back to pond 12. A typical length for return hoses 38 and 39 is on the order of 20–50 feet but they may reach approximately 800 feet or more, depending on the particular harvesting site, pump size and harvesting conditions. The hoses transport the water component of the aquatic plant slurry back to pond 12 and must be of sufficient diameter to allow throughput as required by the pond size and the slurry consistency. A typical diameter is approximately 4–6 inches.

In another preferred embodiment, screen 158 has openings and wire sizes which vary across the width of screen 158. This allows varying degrees of dewatering to occur across the width of screen 158. The variously dewatered aquatic plant can be directed by a plurality of directional chutes to different final destinations, depending on the degree of dewatering. However, screen 158 is typically an 8×8 wire mesh (i.e., 8 wires per inch in either direction).

It should be noted that floating connector 28 may be any suitable conduit connector provided with a floatation device for keeping it afloat on the pond. Floating connector 28 should be capable of connecting connection hose 26 to flexible hose 74. It is preferred that a standard quick disconnect-type connector be used for fast and efficient connection and disconnection of the collection point system, through hose 26, to flexible hose 74.

The underwater piping of the present invention consists of standard pipe materials and fittings capable of withstanding the chemicals and thermal effects found in waste water lagoons or treatment ponds. Preferably, the piping system includes a four inch diameter polyethylene piping system. The pipe 30 running through the pond is preferably a rigid pipe. Intake hose 24, connection hose 26, and flexible hose 74, on the other hand, are all preferably made of flexible, non-collapsible hose pieces. Hoses 26 and 74 are typically three inches in diameter. Hose 24 is typically three inches in diameter.

Pump 22 can be powered with any suitable means including gasoline, diesel fuel, electricity or compressed air, depending on the harvesting site requirements. In this preferred embodiment, pump 22 is a lightweight aluminum pump with three inch inlets and outlets and capable of pumping up to 22,000 gallons per hour. Such a pump is commercially available from Multiquip, Gorman Rupp, Jaeger, or MP. The pump is capable of pumping 1¼ inch solids.

Also, while one embodiment of a harvester 18 is described in this specification, the harvester could be either a skimming type harvester or a lifting type harvester. In either case, the harvester collects duckweed or another aquatic plant from the surface of the pond and transports it to the harbor 14.

It should also be noted that, in a system such as that shown in FIG. 2, a pair of collection points could be used and coupled adjacent connectors 28 in adjacent harvesting zones 20. The harvester could then make sweeps back and forth between the two collection points emptying the load of aquatic plants that has gathered during the trip from one collection point to the next. This could also be accomplished by using any number of collection points in such a system. The present harvesting system provides significant advantages over prior systems. The present system greatly reduces downtime for a harvester and thus maximizes utilization of harvesting equipment and labor.

Although the present invention has been described with reference to preferred embodiments, workers skilled in the art will recognize that changes may be made in form and detail without departing from the spirit and scope of the invention.

I claim:

1. A process for harvesting aquatic plants from a body of water, comprising:
   gathering the aquatic plants from the body of water;
   transporting the gathered aquatic plants to a collection zone defined by a collection device located on the body of water;
   providing an intake means coupled to the collection device for receiving the gathered aquatic plants;
   providing a conduit from a dewatering station to a harboring area on the body of water, the collection device being located in the harboring area while the gathered aquatic plants are transported to the collection zone defined by the collection device;
   providing floating connecting means in the harboring area for connecting the intake means to the conduit; and
   pumping the aquatic plants from the collection zone to the dewatering station through the conduit.

2. The process of claim 1 and further comprising: moving the collection device to the harboring area.

3. The process of claim 2 and further comprising:
   connecting the intake means of the collection device to the floating connecting means.

4. The process of claim 3 wherein pumping comprises:
   creating an input force at the intake means which tends to draw an aquatic plant slurry from the collection zone into the conduit; and
   pumping the aquatic plant slurry from the intake means to the dewatering station.

5. The process of claim 1 and further comprising:
   dewatering the aquatic plants at the dewatering station.

6. The process of claim 1 wherein gathering comprises:
   driving an aquatic plant harvester on the body of water collecting the aquatic plants with the harvester.

7. The process of claim 6 wherein transporting comprises:
   moving the aquatic plants from the harvester to the collection zone at the collection device.

8. The process of claim 7 wherein driving comprises:
   driving the harvester generally away from the collection device to a turn-around point where the harvester is approximately half full; and
   driving the harvester from the turn-around point generally toward the collection device so the harvester is substantially full of aquatic plants at a point nearer the collection device than the turn-around point.

9. The process of claim 8 and further comprising:
   repeating the steps of driving the harvester generally away from the collection device, driving the harvester generally toward the collection device, and moving the aquatic plants from the harvester to the collection zone until the aquatic plants are substantially all collected from a harvesting area disposed about the collection device.

10. The process of claim 1 and further comprising:
    providing a conduit to a plurality of harboring areas on the body of water; and
    providing a plurality of floating connection means, at least one floating connection means provided at each harboring area.

11. The process of claim 10 wherein gathering comprises:
    moving the collection device to a collection point area proximate one of the plurality of floating connection means;
    gathering the aquatic plants from a harvesting area disposed about said harboring area; and
    repeating the steps of moving the collection device and gathering the aquatic plants from a harvesting area until the aquatic plants are substantially all gathered from the body of water.

12. The process of claim 10 and further comprising:
    providing a plurality of collection devices, each collection device connected to a different one of the floating connection means.

13. The process of claim 12 wherein gathering comprises:
    gathering the aquatic plants from a plurality of harvesting areas, each harvesting area corresponding to one of the plurality of collection devices.

14. The process of claim 13 wherein transporting comprises:
    transporting the gathered aquatic plants to the collection device corresponding to the harvesting area from which the aquatic plants were gathered.

15. The process of claim 1 and further comprising: providing a floating harbor as the collection device.

16. The process of claim 15 wherein providing a floating harbor comprises:
    providing an intake structure including a weir within the containment area;
    providing conduit from the intake structure to the dewatering station; and
    providing a pump on the floating harbor for pumping the aquatic plants from the input structure to the dewatering station through the conduit.

17. A method of harvesting aquatic plants from a water surface, the method comprising:
    collecting aquatic plants from the water surface with a harvester;
    moving the collected aquatic plants to a collection zone on the water surface;
    transferring, substantially independently of the harvester, the collected aquatic plants from the collection zone to a dewatering station;
    wherein collecting comprises driving the harvester in a harvesting area proximate the collection zone collecting the aquatic plants; and
    wherein driving comprises:
    driving the harvester generally away from the collection zone until the harvester is approximately half full of aquatic plants; and
    driving the harvester generally toward the collection zone substantially filling the harvester with aquatic plants.

18. The method of claim 17 wherein moving comprises:
    unloading the collected aquatic plants from the harvester to a harbor on the water surface, the harbor physically defining the collection zone.

19. The method of claim 18 wherein transferring comprises:
    pumping the aquatic plants from the collection zone to the dewatering station.

20. The method of claim 17 and further comprising:
    providing a floating harbor wherein the collection zone is located in the floating harbor.

21. The method of claim 17 wherein transferring comprises:
    providing conduit from the collection zone to the dewatering station; and
    causing the aquatic plants to be moved through the conduit from the collection zone to the dewatering station.

22. A system for harvesting aquatic plants from a water surface, the system comprising, in combination:
    gathering means for gathering the aquatic plants from the water surface;
    a harbor, on the water surface, for receiving the gathered aquatic plants from the gathering means and for holding at least a portion of the gathered aquatic plants in a collection zone;
    processing means for processing the aquatic plants;
    transferring means for transferring the aquatic plants from the collection zone to the processing means; and
    wherein the transferring means comprises conduit means, running from the collection zone to the processing means, for carrying the aquatic plants from the collection zone to the processing means.

23. The combination of claim 22 wherein the processing means comprises:
    dewatering means for dewatering the aquatic plants.

24. The combination of claim 22 wherein the conduit means comprises:
- a pipe running from the processing means to the collection zone;
- intake means in the collection zone for receiving gathered aquatic plants from the collection zone; and
- floating connection means for connecting the intake means to the pipe.

25. The combination of claim 24 wherein the floating harbor is at a harvesting area on the water surface, and wherein the pipe comprises:
- a first portion extending from the processing means to an area below the harvesting area; and
- a second portion extending from the first portion to the floating connection means.

26. The combination of claim 25 wherein the first portion comprises:
- a flexible tube extending from the processing means to a connection area adjacent the water surface; and
- a rigid portion extending from the connection area to the area below the harvesting area.

27. The combination of claim 24 wherein the intake means comprises:
- an intake structure disposed within the collection zone;
- an intake hose coupled from the intake structure to a pump input; and
- a connection hose coupled from a pump output to the floating connection means.

* * * * *